United States Patent [19]

Lord

[11] 4,420,974
[45] Dec. 20, 1983

[54] IN-SITU MEASUREMENT SYSTEM

[75] Inventor: David E. Lord, Livermore, Calif.

[73] Assignee: The United States of America as represented by the United States Department of Energy, Washington, D.C.

[21] Appl. No.: 209,929

[22] Filed: Nov. 24, 1980

[51] Int. Cl.³ .................. E21B 49/00; G01F 1/68; H01G 3/04
[52] U.S. Cl. ..................... 73/154; 73/204; 338/25; 338/26; 338/260; 374/114; 374/185
[58] Field of Search ............. 73/154, 204, 340, 342, 73/362.8; 338/25, 28, 229, 26, 48, 260, 275

[56] References Cited

U.S. PATENT DOCUMENTS

| | | | |
|---|---|---|---|
| 2,344,648 | 3/1944 | Simmons, Jr. | 338/275 |
| 2,408,149 | 9/1946 | Miller et al. | 338/275 |
| 2,625,043 | 1/1953 | Tapp et al. | 73/342 |
| 2,694,930 | 11/1954 | Lamb et al. | 338/28 |
| 2,753,713 | 7/1956 | Mabey | 73/342 |
| 2,796,455 | 6/1957 | Jones | 338/26 |
| 2,800,018 | 7/1957 | Phillips et al. | 73/204 |
| 2,817,235 | 12/1957 | Hunter et al. | 73/154 |
| 2,876,326 | 3/1959 | Akmentin | 338/275 |
| 3,199,348 | 8/1965 | Salera | 73/204 |
| 3,357,248 | 12/1967 | Tyson | 73/342 |
| 3,464,269 | 9/1969 | Froger | 73/204 |
| 3,603,147 | 9/1971 | Dorman | 73/204 |
| 3,604,261 | 9/1971 | Olin | 73/189 |
| 3,616,689 | 11/1971 | Schdberg | 73/154 |
| 3,714,832 | 2/1973 | Howell et al. | 73/154 |
| 3,892,128 | 7/1975 | Smith, Jr. | 73/154 |
| 3,942,378 | 3/1976 | Olmstead | 73/204 |
| 4,024,761 | 5/1977 | Djorup | 73/204 |
| 4,043,196 | 8/1977 | Trageser | 73/204 |
| 4,080,821 | 3/1978 | Johnston | 73/27 R |
| 4,245,503 | 1/1981 | Hawk et al. | 73/204 |

FOREIGN PATENT DOCUMENTS

| | | | |
|---|---|---|---|
| 490483 | 8/1938 | United Kingdom | 73/342 |
| 590678 | 2/1978 | U.S.S.R. | 73/204 |

Primary Examiner—Steven L. Stephan
Assistant Examiner—David V. Carlson

[57] ABSTRACT

A multipurpose in situ underground measurement system comprising a plurality of long electrical resistance elements in the form of rigid reinforcing bars, each having an open loop "hairpin" configuration of shorter length than the other resistance elements. The resistance elements are arranged in pairs in a unitized structure, and grouted in place in the underground volume. The electrical resistance of each element and the difference in electrical resistance of the paired elements are obtained, which difference values may be used in analytical methods involving resistance as a function of temperature. A scanner sequentially connects the resistance-measuring apparatus to each individual pair of elements. A source of heating current is also selectively connectable for heating the elements to an initial predetermined temperature prior to electrical resistance measurements when used as an anemometer.

7 Claims, 9 Drawing Figures

IN-SITU MEASUREMENT SYSTEM

The United States Government has rights in this invention pursuant to Contract W-7405-ENG-48 between the U.S. Department of Energy and the University of California.

BACKGROUND OF THE INVENTION

The invention relates to methods and systems for measuring temperature and other parameters of interest throughout a given volume. More particularly, it relates to an underground measurement method and apparatus wherein an array of long bar resistance elements are interposed and emplaced throughout an underground volume to be monitored, and electrical resistance measurements of the elements are made and analyzed for determining various parameters.

It is often necessary or desirable to make measurements in underground volumes to determine conditions and characteristics of the particular geo-mass or volume of interest. For instance, it may be desirable to measure temperature conditions, thermal diffusivity (rock conductivity), fluid flow conditions, density of the surrounding formations, or the degree of rubblization. The measurements may be made symmetrically throughout the mass or at particular isolated areas or locations of interest therein.

DISCUSSION OF BACKGROUND AND PRIOR ART

Heretofore, the gathering of such information has required the installation of sensitive instruments at numerous locations throughout the mass. Conventionally, this has involved the installation of thermocouples when it is desired to monitor temperatures, or the installation of relatively fragile flow-detecting instruments at multiple locations when information such as fluid flow conditions is sought. Such installations entail considerable expense in view of the number of instruments required, the large number of boreholes which must be drilled for sensor placement, and the complexity of the associated equipment. Furthermore, such conventional instruments require great numbers and lengths of electrical leads extending throughout the mass, which are very susceptible to electrical insulation failures and other damage which may be caused by a deleterious environment and stressful conditions such as earthquakes.

In some processes for fossil fuel extraction, the instruments can be subjected to considerable mechanical stress. In recovery of oil from shale deposits, for example, it is customary to "fracture" the formations for achieving rubblization, and then to initiate burning conditions in a particular block of the rubble for retorting the deposits. Temperature, flow, and in situ thermal property measurements are useful before and after "fracturing". However, the conventional instruments, thermocouples or anemometers, cannot usually be emplaced prior to "fracturing", or otherwise they would be destroyed. Similar problems are encountered in coal seam investigations. Obviously, the expense involved, in time and money, for monitoring such formations is therefore considerable.

Accordingly, it is an object of the invention to provide an in situ underground measurement system for measuring temperatures or fluid flow conditions and other parameters of interest throughout a given underground volume, which is of great strength and reliability, will withstand deleterious environments and great temperatures, and yet is very economical for manufacturing, installation, and maintenance.

It is another object to provide a multi-purpose underground measurement system utilizing an array of temperature-sensitive electrical resistance elements of great strength and corrosion resistance, which can function as a thermometer to measure temperatures at desired locations in a volume of interest, or as an anemometer to measure fluid flow conditions and other parameters of interest at said locations, and which is able to survive such normally destructive processes as "fracturing" of oil shale deposits and in situ burning of deposits, such as coal or oil shale.

It is a further object to provide an underground measurement system comprising a plurality of temperature-sensitive elements adapted to be interposed and emplaced throughout a given underground volume of interest, and which elements are of a configuration providing easy access for connecting to electrical leads from the associated instrumentation, with little or no exposure of the electrical leads to the underground environment.

It is a still further object to provide a multi-purpose underground measurement system which can function either as a thermometer for measuring temperatures in an underground volume of interest, or as an anemometer for measuring fluid flow conditions and other parameters of interest in said volume, and which comprises an array of temperature-sensitive elements adapted to be grouted in place in desired locations, and whose electrical resistances can be individually measured for determining average temperatures over selected distances throughout the volume for use in either of its functional roles.

Additional objects, advantages and novel features of the invention will be set forth in part of the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The invention herein disclosed is an underground measurement system which utilizes an array of long bar resistance elements interposed throughout the volume of interest, each of which is preferably in a U-shaped open loop or "hairpin" configuration, and is in relatively close thermal proximity to, and has a different length than, the other elements in the array. The apparatus can function over a volume as a thermometer or a resistance anemometer for use as a fluid flow meter or thermal diffusivity/rock density meter. All functions involve measuring the electrical resistance of each bar element by suitable measuring means or conventional electric bridge methods, and the resistance of a "hairpin" element subtracted from the next longer element to determine the resistance of the segment—the length of the longer "hairpin" in the region not shared in common with the shorter element. From the resistance value so obtained, the resistivity of the segment and the average temperature along the segment may be readily determined and used in various analytical methods to yield information with respect to the underground volume.

BRIEF DESCRIPTION OF THE DRAWINGS

The accompanying drawings, which are incorporated in and form a part of the specification, illustrate a preferred embodiment of the present invention and, together with the description, serve to explain the principles of the invention. In the drawings.

DESCRIPTION OF A PREFERRED EMBODIMENT

Figure 1:
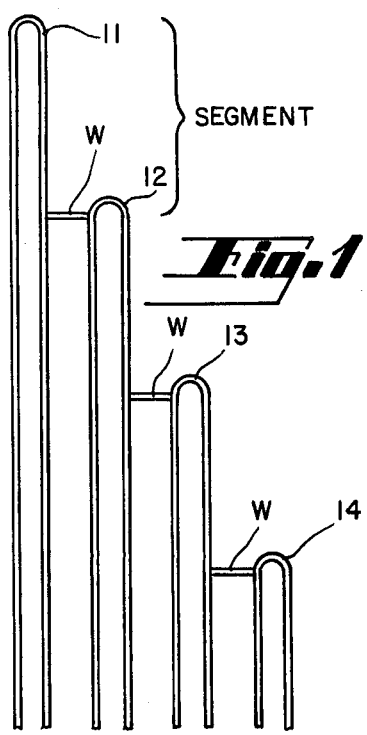
FIG. 1 shows an array of rigid bar resistance elements as are used in the invention, the resistance elements being shown in a planar configuration primarily for illustration purposes.

Referring more particularly to the drawings, there is shown in FIG. 1 an assembly of steel bar resistance elements 11-14 which are disposed in a generally parallel relation and in relatively close proximity to one another in accordance with the invention. For ease of description, the bars are shown in a planar configuration, although the four elements, disposed in generally parallel relation, could be wound in a circle for compactness or arranged in a preferred "nested" configuration which is the most suitable for most applications.

While the individual bars could be straight members, the looped "hairpin" configuration of an element with all the free ends of the elements disposed adjacent one another at the same end of the array is most preferred, since this simplifies the attachment and maintenance of electrical leads. This is an important feature of the invention, and is a particularly desirable feature when the particular volume of interest has only one accessible face.

To ensure the elements are maintained in the desired configuration and spacing, and also to increase the strength and rigidity of the array of elements, spacer members of the same material as the bar elements 11-14 are welded between adjacent elements as shown, a single spacer W between elements. These have no significant thermal effect on the bar elements, and have no bearing on the resistance measurements.

It is also a characteristic and a feature of the invention that each of the bar elements 11-14 is of different length. As the invention is used, electrical resistance measurements are made for each looped bar element. The resistance of an element is subtracted from the resistance of the next adjacent longer element, to thereby obtain the resistance of that segment of the longer element which extends beyond the looped end of the adjacent parallel shorter element. From the resistance value obtained for the segment, its resistivity can be readily obtained, and its temperature calculated or derived from temperature versus resistivity curves for the bar material being used.

Accordingly, by this scheme all desired information is derivable from the resistance measurements for the segments obtained by the subtraction process, with the exception of the resistance measurement for the smallest bar element, which represents a segment by itself.

Figure 8:
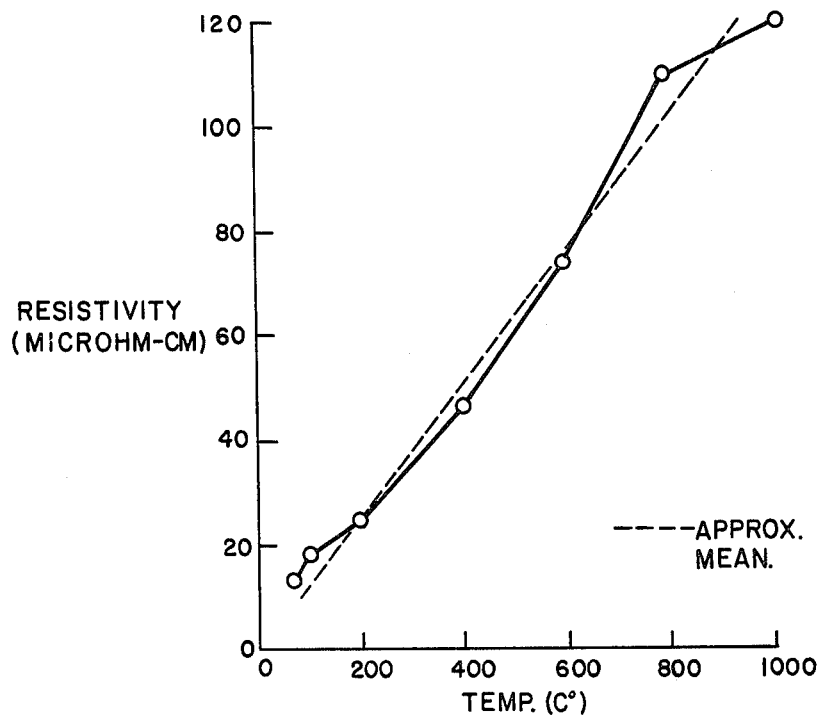
FIG. 8 is a graph of resistivity versus temperature for carbon steel.

Standard commercially available reinforcing bars, widely used in the construction trades and known as "rebar", are particularly suitable for use as the resistance elements 11-14. Such material, typically a low carbon steel comprising approximately 0.35% carbon, constitutes a practical choice because of its great strength, the fact that, as shown in FIG. 8, it exhibits a virtually linear resistivity vs. temperature curve whose non-linearities can be easily compensated, and a temperature sensitivity characterized by relatively large changes in electrical resistance for a given change in temperature.

It is to be noted that the resistance value obtained for the segment is indicative of the average temperature over the length of the segment. For making the resistance measurements and determining the segment resistance, it is assumed, of course, that the bars whose resistances are compared are in reasonably close thermal proximity, usually less than 10 inches for most applications, and also that there are identical gradients along the bars. By monitoring changes in electrical resistance of the segments as caused by heating or cooling of the bars, various parameters and conditions of the surrounding mass may be calculated or inferred from the observed heat gain or loss.

While the lengths of the bars and segments are most arbitrary, common multiples and uniform segment lengths simplify applications. For example, the elements 11-14 in FIG. 1 may have lengths of 80, 60, 40, and 20 feet, respectively, thus providing segment lengths of 20 feet. Furthermore, whereas the elements in FIG. 1 show uniform differences in lengths, this is not required. The element 13, for example, could be much longer than element 11 if so desired.

The most practical configuration for the array is illustrated in FIGS. 2 through 6, wherein all of the "rebars" are disposed coaxially with all of their elongate legs in parallel relation and each electrically separated from the other as by the use of spacer members used in the device of FIG. 1. In this "nested" configuration, the entire array can be slipped into an access hole for placement in the volume of interest.

The design of each "rebar" element in the "hairpin" configuration must be such that the two parallel legs are in close thermal proximity. For ⅜-inch diameter "rebar", which is a standard commercial size, a spread of 1¼ inches between the legs provides an external dimension of two inches, which is a convenient diameter for drill hole purposes.

When installed in place, electrical leads are attached, as by solder or clamps, to the free ends of the bar elements. The electrical connections include a pair of current leads, one for each leg of a "hairpin", and a pair of separate voltage leads, one lead for each leg.

Figure 2:
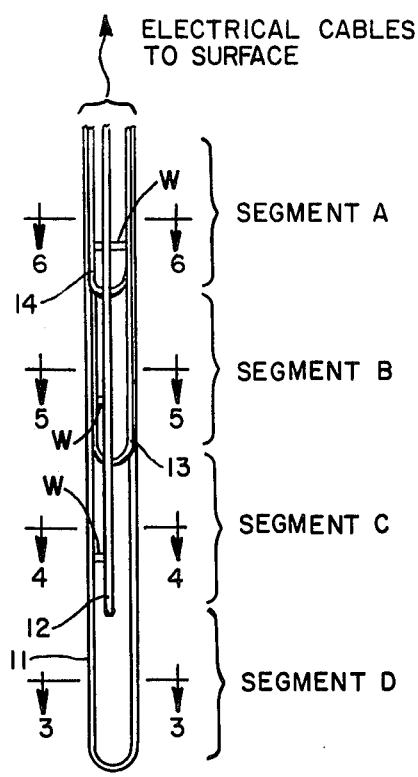
FIG. 2 shows an array of resistance elements as are used in the invention, in a preferred "nested" configuration suitable for most applications.
Figure 3:
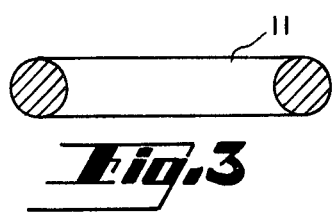
FIG. 3 is a view of the configuration of elements in FIG. 2 as appearing in a sectional view taken along the section line 3—3 in FIG. 2.
Figure 4:
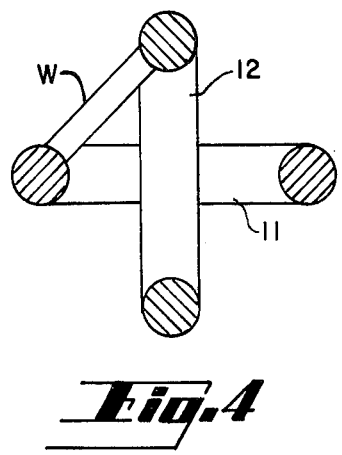
FIG. 4 is a view of the configuration of elements in FIG. 2 as appearing in a sectional view taken along the section line 4—4 in FIG. 2.
Figure 5:
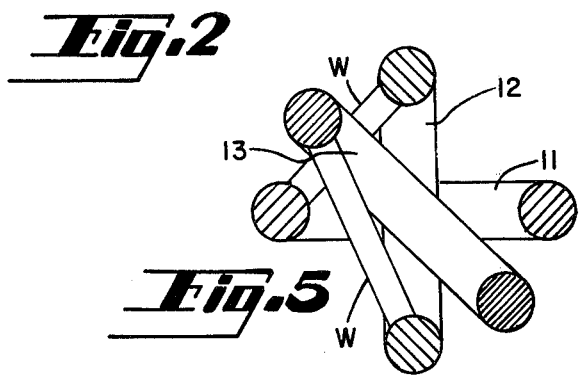
FIG. 5 is a view of the configuration of elements in FIG. 2 as appearing in a sectional view taken along the section line 5—5 in FIG. 2.
Figure 6:
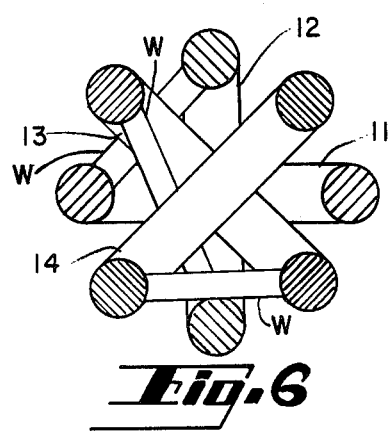
FIG. 6 is a view of the configuration of elements in FIG. 2 as appearing in a sectional view taken along the section line 6—6 in FIG. 2.
Figure 9:
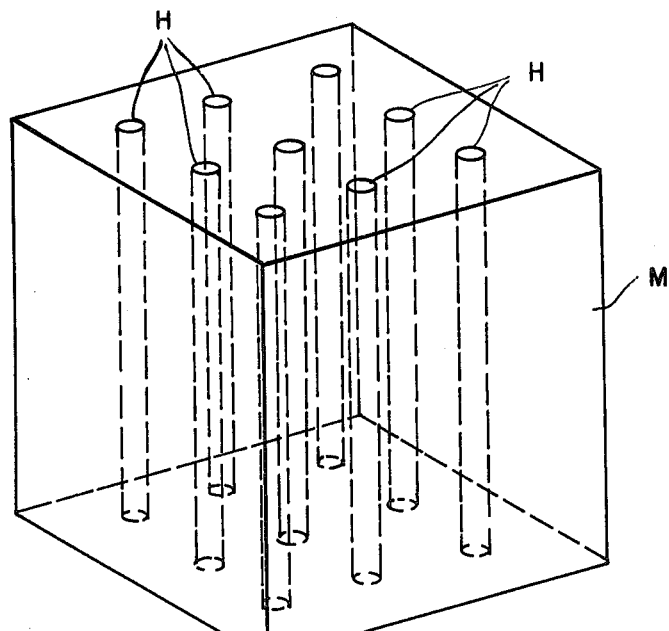
FIG. 9 is an arrangement or pattern of holes formed in a given volume or geo-mass, in each of which is disposed an array of steel bar resistance elements according to the invention.

When an array of elements, such as in the configuration shown in FIG. 2, is emplaced in a drill hole, the hole is then filled with mortar or other suitable grouting material, and the elements are "grouted" in place. The electrical leads, attached at the free ends of the bar elements, have minimal exposure and contact with the underground mass, and have none at all when the ends of the elements are at the surface. For monitoring conditions in a large volume of interest, a pattern of holes, each containing an array of "rebar" resistance elements, may be provided in the volume, in sufficient number and in the necessary locations whereby the information desired may be obtained. FIG. 9 is illustrative of a pattern of holes H and array locations for monitoring a large geologic block of material M. While the pattern shown is symmetric, it is obvious that the particular pattern for holes and arrays may be individually tailored to each experimental application to accommodate differences in access availability to the facets of the volume to be monitored and differences in the amount and quality of the measurements to be made. Furthermore, since the apparatus in accordance with the invention measures average temperature over a segment length of perhaps 10 to 20 feet or more, it has a decided advantage over the use of thermocouples which measure temperature at a point, particularly when monitoring large volumes in such heat insulating materials as coal.

When used as a thermometer for detecting temperatures along resistance segments at specific areas in the volume of interest, the resistance for a particular bar element can be measured by conventional electric bridge methods or by application of current from a constant current source and measurement of the voltage across the free ends of the looped "rebar" element. Since the resistance of a "rebar" element is generally low, the current must be fairly high as in the range of 1 to 10 amperes, so that a reasonable voltage (in the range of 100–1000 mV) is produced.

The temperature sensitivity is dependent on the particular geometry of the array and the allowable sensing current. For example, in a 20-foot segment (or a forty-foot looped "hairpin" element of $\frac{3}{8}$-inch diameter), a 10-ampere current source produces a sensitivity of 2 mV per degree Centigrade which is approximately 40 times greater than the best thermocouple sensitivity without amplification.

The invention is also adapted to function as an anemometer according to the principle of operation of the conventional hot-wire anemometer. As an anemometer, the invention can function as a flowmeter to detect fluid flow in the formations of interest, or for determining other parameters such as thermal diffusivity or conductivity of the bulk solid medium, density, or degree of rubblization. Such a mode of operation requires that the bars be heated to produce high temperatures exceeding several hundred degrees Centigrade by application of high current for several minutes. The cooling of elements and amount of heat loss is therefore indicative of fluid flow; or in oil shale processes, it would indicate areas of geo-mass contact and location of channels for fluid flow prior to instituting gas flow and ignition.

Figure 7:
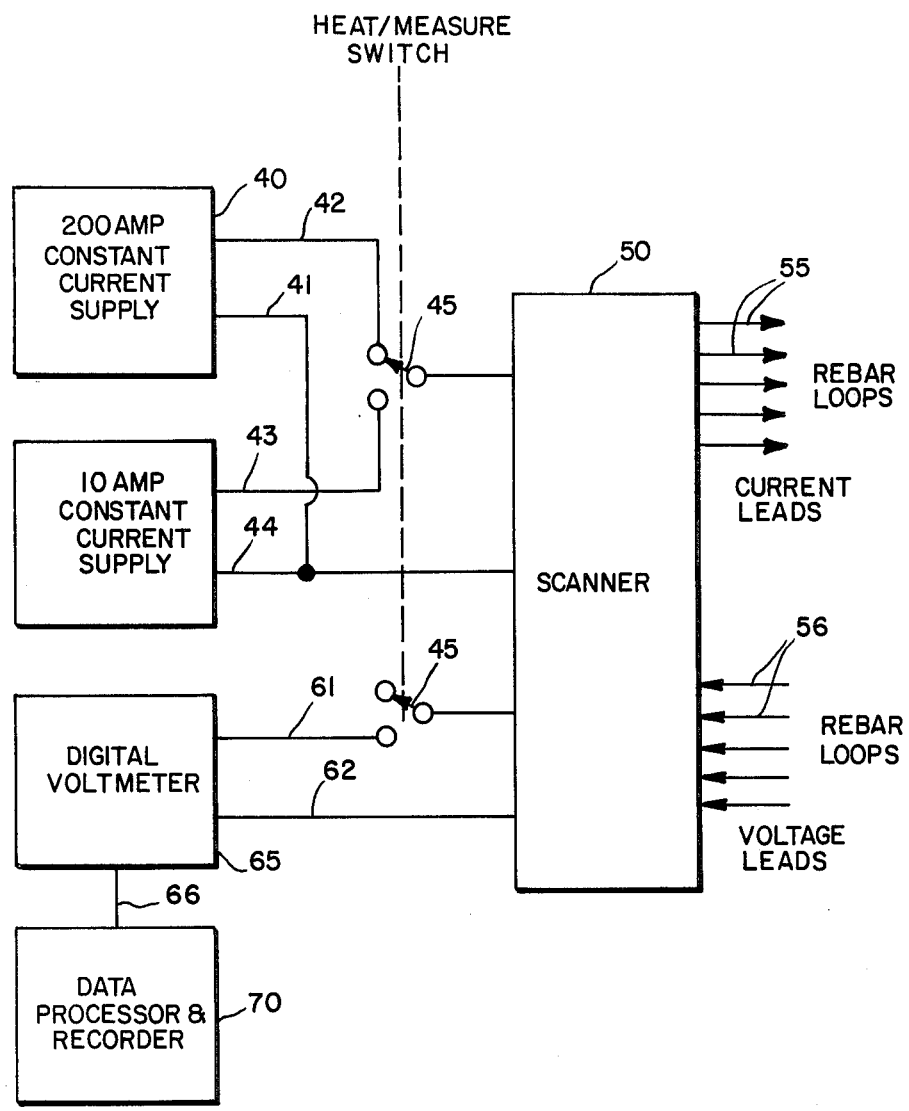
FIG. 7 is a block diagram of the electrical system for selectively applying heating current to the array of resistance elements, and for making electrical measurements of each of the elements for use in determining parameters of interest.

The electrical apparatus which is selectively connectable to the several elements in an array is shown in a block diagram in FIG. 7. The apparatus includes a 200-amp constant current power supply 40 which is selectively connectable to the several "hairpin" elements of an array for applying a heating current to the elements when the apparatus is used as a resistance anemometer for measuring fluid flow, thermal diffusivity, or density. A mechanical switch 45 is provided for connecting the leads 41,42 from the 200-amp supply with a scanner 50 which connects with all the elements in an array. The scanner 50 may be any suitable conventional type, although it is readily replaceable by mechanical switching means if so desired.

When it is desired to measure the electrical resistance of each of the "hairpin" elements after the heating current supply is disconnected, or when the apparatus is to be used a thermometer, the switch 45 is thrown to connect the 10-amp constant current supply to the two free ends of a single resistance element via the scanner 50 and two of the current leads 55. At the same time the 10-amp current is applied to an element, the leads 61–62 from a digital voltmeter 65 are also connected through means of the scanner 50 and a pair of voltage leads 56 to the same free ends of the single resistance element being measured.

By means of the scanner 50, the 10-amp current leads 43,44 and the pair of voltmeter leads 61,62 are switched to the next element whose resistance is next to be measured by connection with the associated current leads 55 and the voltage leads 56 attached thereto. By sequential operation of the scanner, the process is repeated for making voltage measurements for each element of the array.

For processing the voltage information obtained by the digital voltmeter 65, the voltage signals are transmitted over connector 66 to a data processor and recorder 70 for resistance and resistivity calculations, temperature determinations, and other parameter determinations of interest.

It should be readily apparent that the system lends itself to simple computer control and read-out. Resistance normalization, since the loop lengths are probably not exact multiples of each other, allows the use of a common resistivity/temperature curve for calculating temperatures and applying corrections. Simple analysis indicates obtainable accuracy of much better than 5%. The flow calculations and thermal calculations can be readily accomplished, as well as the thermal time-response analysis, by a minimal conventional computing facility. Deep, down-hole control and read-out can be accomplished by known technology, and since the system is truly multipurpose, several other systems can be eliminated.

It will therefore be apparent that an in situ measurement system is disclosed herein which is capable of withstanding great mechanical stress, is simple to manufacture and install, and is relatively inexpensive. A "rebar" array has been shown to survive complete rubblization as experienced in several earthquakes.

From the electrical point of view, since the bar is already of such a low resistance, the effects of conductive gases and liquids are minimized. Such materials would have to possess electrical conductivities comparable to the bar and cover a large portion of its length, to produce significant effects. In reality, for all practical applications, nothing in the environment approaches within orders of magnitude the low resistance of the bar. The use of grout, furthermore, has demonstrated no effect on accuracy of measurement, while adding great mechanical strength to the system.

Corrosion of the steel bar elements can be a problem, as with all metal elements in such hostile environments. However, corrosion-inhibitive coatings such as "fire clay" applied to the steel bars significantly extend the useful life of the bars, and do not interfere with the electrical readings. Accordingly, there is rarely a need to compensate for corrosion effects.

The foregoing description of a preferred embodiment of the invention has been presented for purposes of illustration and description. It is not intended to be exhaustive or to limit the invention to the precise form disclosed, and obviously many modifications and variations are possible in the light of the above teaching. For example, other metals than carbon steel "rebar" could be used for the resistance elements when considering their cost, mechanical strength, and corrosion susceptibility. The number of resistance elements and segments in an array can also vary as deemed necessary. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. An in situ measurement system for measuring temperatures and other parameters and conditions in an underground volume of interest, said system comprising:
   a plurality of steel bar resistance elements emplaced in spaced relation in the underground volume of interest, each said bar having the same uniform and known temperature functional resistance characteristics along its length, each said element having a U-shaped open loop "hairpin" configuration with two parallel legs in close thermal proximity, said elements being arranged in pairs with the elements in each said pair sharing nearly a common path in close thermal proximity throughout the extent of the shorter element in the pair, and with the free ends of each said element disposed adjacent the free ends of the other elements; and
   measurement means for obtaining, for said pairs, the electrical resistance of each element and the difference in electrical resistance of the two elements in each pair, whereby said resistance difference values may be used in analytical methods involving resistance as a function of temperature to obtain information with respect to said underground volume.

2. A measurement system as described in claim 1, wherein said measurement means includes scanning means for sequentially connecting said measurement means to said pairs of steel bar resistance elements, whereby said difference values are obtained in sequence.

3. A measurement system as described in claim 1, further including
   a source of high current; and
   means for applying said high current to said steel bar resistance elements for a predetermined period for heating the elements to a preselected temperature exceeding several hundred degrees centigrade prior to operation of said measurement means, whereby said system is adapted to function as an anemometer for determining fluid flow conditions and other parameters of interest with respect to said underground of volume.

4. A measurement system as described in claim 1, wherein said measurement means includes a source of fairly high constant current; voltmeter means; and switching means for selectively connecting said source of fairly high constant current and said voltmeter means to a selected pair of the steel bar resistance elements, whereby the electrical resistance of each of said elements is readily determined from the values of the fairly high constant current and the voltage across said element.

5. A measurement system as described in claim 1, wherein each said steel bar resistance element is connected to an adjacent element by a single spacer member of steel composition, thereby providing a rigid, unitized structure of said elements, and maintaining said elements in a desired parallel spaced relationship.

6. A measurement system as described in claim 5, wherein said plurality of steel bar resistance elements and spacer members is grouted in place in the underground volume of interest.

7. A measurement system as described in claim 5, wherein said steel bar resistance elements are disposed in a longitudinally coaxial nested relationship, thereby providing a rigid unitized structure of said elements which can be easily installed in a drill hole provided in the underground volume and grouted in place therein.

* * * * *